(12) United States Patent
Czapla et al.

(10) Patent No.: US 12,398,677 B2
(45) Date of Patent: Aug. 26, 2025

(54) POWERPLANT FOR AN AIRCRAFT

(71) Applicant: Airbus Operations SAS, Toulouse (FR)

(72) Inventors: Lionel Czapla, Toulouse (FR); Emmanuel Vardelle, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 93 days.

(21) Appl. No.: 18/456,587

(22) Filed: Aug. 28, 2023

(65) Prior Publication Data
US 2024/0067355 A1    Feb. 29, 2024

(30) Foreign Application Priority Data
Aug. 30, 2022 (FR) ...................................... 2208674

(51) Int. Cl.
| | | |
|---|---|---|
| *F02C 7/22* | (2006.01) | |
| *F01D 9/02* | (2006.01) | |
| *F01D 21/04* | (2006.01) | |
| *F02C 3/22* | (2006.01) | |
| B64D 37/30 | (2006.01) | |
| B64D 37/32 | (2006.01) | |

(52) U.S. Cl.
CPC .............. *F02C 7/222* (2013.01); *F01D 9/026* (2013.01); *F01D 21/045* (2013.01); *F02C 3/22* (2013.01); *F02C 7/22* (2013.01); B64D 37/30 (2013.01); B64D 37/32 (2013.01); F05D 2240/14 (2013.01); F05D 2240/15 (2013.01)

(58) Field of Classification Search
CPC .... F02C 7/222; F02C 3/22; F02C 7/22; F01D 9/026; F01D 21/045; B64D 37/30; B64D 37/32; F05D 2240/14; F05D 2240/15
See application file for complete search history.

(56) References Cited

U.S. PATENT DOCUMENTS

| | | |
|---|---|---|
| 4,062,184 A | 12/1977 | Hagen |
| 2005/0025615 A1 | 2/2005 | Gabrys et al. |

(Continued)

FOREIGN PATENT DOCUMENTS

| | | |
|---|---|---|
| DE | 2413507 A1 | 10/1975 |
| GB | 1453873 A | 10/1976 |

OTHER PUBLICATIONS

French Search Report for corresponding French Patent Application No. 2208674 dated Mar. 17, 2023; priority document.

*Primary Examiner* — Gerald L Sung
*Assistant Examiner* — Rene D Ford
(74) *Attorney, Agent, or Firm* — Greer, Burns & Crain, Ltd.

(57) ABSTRACT

A powerplant for an aircraft, comprising a frame, a propulsion system comprising a core enclosed in a casing and comprising a combustion chamber and a turbine, a supply pipe for conveying dihydrogen to the combustion chamber and that snakes outside the casing running along the turbine before dropping down into the combustion chamber through the casing, and a protective cylinder fastened to the frame or to the casing by fastening means and positioned around the casing and between the supply pipe and the turbine. With such an arrangement, if a blade of the turbine became detached it would meet the protective cylinder blocking its path to the dihydrogen pipe and would thus be diverted or stopped.

7 Claims, 5 Drawing Sheets

(56) References Cited

U.S. PATENT DOCUMENTS

| | | | |
|---|---|---|---|
| 2008/0073460 A1* | 3/2008 | Beardsley | F02K 3/06 |
| | | | 244/54 |
| 2012/0082541 A1 | 4/2012 | Macchia et al. | |
| 2013/0142634 A1* | 6/2013 | Sahores | F04D 29/526 |
| | | | 29/889.22 |
| 2017/0198604 A1* | 7/2017 | Lefebvre | F01D 25/30 |
| 2018/0283204 A1 | 10/2018 | Fracchia et al. | |
| 2018/0320633 A1 | 11/2018 | Moniz et al. | |
| 2023/0265797 A1* | 8/2023 | Brady | F02C 3/30 |
| | | | 60/736 |

* cited by examiner

POWERPLANT FOR AN AIRCRAFT

CROSS-REFERENCES TO RELATED APPLICATIONS

This application claims the benefit of the French patent application No. 2208674 filed on Aug. 30, 2022, the entire disclosures of which are incorporated herein by way of reference.

FIELD OF THE INVENTION

The present invention relates to a powerplant for an aircraft, the powerplant comprising a frame fastened to a structure of a wing of the aircraft, a single-flow propulsion system such as a turboprop engine, fastened to the frame, a dihydrogen pipe that supplies the combustion chamber of the propulsion system with the dihydrogen, and a protective cylinder fastened around the frame between the dihydrogen pipe and the turbine of the propulsion system. The invention also relates to an aircraft comprising at least one such powerplant.

BACKGROUND OF THE INVENTION

In order to move, an aircraft conventionally comprises at least one powerplant comprising a single-flow propulsion system such as a turboprop engine. Such a propulsion system comprises a core that is enclosed in a casing and comprises, inter alia, from upstream to downstream, a compressor, a combustion chamber and a turbine. As the case may be, the propulsion system also comprises a fan or a propeller rotated by the core. The compressor and the turbine each have blades that are fastened to a rotating shaft.

The powerplant also comprises a frame that is fastened to a structure of the wing of the aircraft and thus forms an attachment pylon under the wing.

In order to limit the pollution due to the use of kerosene, the use of dihydrogen as a fuel in the combustion chamber is envisaged.

This dihydrogen is conveyed from a tank to the combustion chamber by a dihydrogen pipe that extends at least partially in the powerplant. Due to the structure of the powerplant and its position under the wing and on the front of the wing, the dihydrogen pipe passes through the frame coming from the wing and thus runs from the back towards the front to the combustion chamber.

In order to limit the impact of the temperature of the core on the dihydrogen pipe, the pipe runs outside the casing and reaches the combustion chamber through the casing.

In the event of an incident on the propulsion system, some blades of the turbine or the compressor might detach from the shaft and, due to their speed, pass through the casing, potentially cutting the dihydrogen pipe.

SUMMARY OF THE INVENTION

One object of the present invention is to propose a powerplant that comprises protective means making it possible to protect a dihydrogen pipe passing in the vicinity of the blades of the turbine of the single-flow propulsion system.

To that end, a powerplant for an aircraft is proposed, comprising:
a frame,
a propulsion system fastened to the frame and comprising
a core enclosed in a casing and comprising a combustion chamber and a turbine provided with blades rotating about a longitudinal axis,
a supply pipe for conveying dihydrogen to the combustion chamber, in which the supply pipe snakes outside the casing running along the turbine before dropping down into the combustion chamber through the casing, and
a protective cylinder fastened to the frame or to the casing by fastening means and positioned around the casing and between the supply pipe and the turbine.

With such an arrangement, if a blade of the turbine became detached it would meet the protective cylinder blocking its path to the dihydrogen pipe and would thus be diverted or stopped.

Advantageously, a front end of the protective cylinder is positioned, perpendicular to the longitudinal axis, at least at the foremost blades of the turbine, and the rear end of the protective cylinder is positioned, perpendicular to the longitudinal axis, at least at the rearmost blades of the turbine.

Advantageously, the protective cylinder extends in front of the foremost blades of the turbine and behind the rearmost blades of the turbine.

According to a particular embodiment, the fastening means comprise a front fastening system arranged at the level of a front part of the protective cylinder and two lateral fastening systems positioned on either side of a vertical mid-plane of the powerplant, the front fastening system comprises a front rod hingedly fastened by a first connection point to the casing at the level of the mid-plane and by a second connection point to the protective cylinder at the level of the mid-plane, and each lateral fastening system comprises a lateral rod hingedly fastened by a first connection point to the protective cylinder and by two second connection points to the casing.

According to a particular embodiment, the fastening means comprise a front fastening system arranged at the level of a front part of the protective cylinder and two lateral fastening systems positioned on either side of a vertical mid-plane of the powerplant, the front fastening system comprises a front rod hingedly fastened by a first connection point to the frame at the level of the mid-plane and by a second connection point to the protective cylinder at the level of the mid-plane, and each lateral fastening system comprises a lateral rod hingedly fastened by a first connection point to the frame and by two second connection points to the protective cylinder.

According to a particular embodiment, the fastening means comprise an outer flange rigidly connected to the casing and an inner flange rigidly connected to the protective cylinder and arranged at a rear part of the protective cylinder, the inner flange bears on a front face of the outer flange and the fastening means comprise fastening elements that fasten the two flanges against each other.

Advantageously, the protective cylinder comprises at least two hollow cylinder portions fastened to each other by rigid connection systems.

Advantageously, the protective cylinder comprises an upper semi-cylinder and a plurality of lower semi-cylinders fastened to the upper semi-cylinder by rigid connection systems and two adjacent lower semi-cylinders are separated from each other parallel to the longitudinal axis.

The invention also proposes an aircraft comprising a wing, a dihydrogen tank and at least one powerplant according to one of the preceding variants, in which the frame is fastened to the wing and in which the supply pipe is fluidly connected to the dihydrogen tank.

BRIEF DESCRIPTION OF THE DRAWINGS

The aforementioned features of the invention, and others, will become more clearly apparent on reading the following description of one exemplary embodiment, the description being given with reference to the appended drawings, in which.

DETAILED DESCRIPTION OF THE PREFERRED EMBODIMENTS

Figure 1:
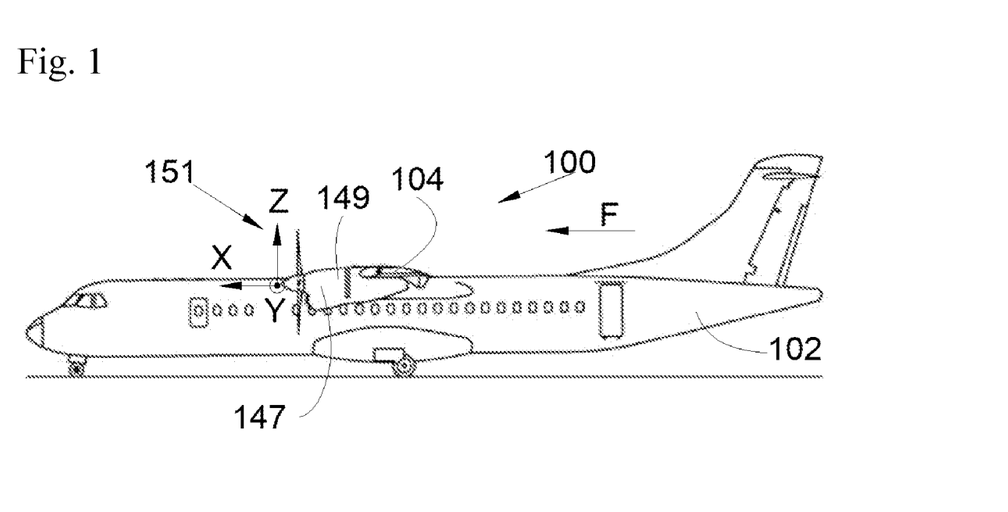
FIG. 1 is a side view of an aircraft comprising a powerplant according to the invention.

In the following description, terms relating to position are given with reference to an aircraft in a position of forward travel, i.e., as shown in FIG. 1, in which the arrow F shows the direction of forward travel of the aircraft.

In the following description, as is conventional, the longitudinal axis of the propulsion system, which is parallel to the longitudinal axis of the aircraft positively oriented towards the front in the direction of forward travel of the aircraft, is referred to as X, the transverse axis, which is horizontal when the aircraft is on the ground, is referred to as Y, and the vertical axis or vertical height when the aircraft is on the ground is referred to as Z, these three axes X, Y and Z being orthogonal to each other.

FIG. 1 shows an aircraft 100 that has a fuselage 102 on either side of which is fastened a wing 104. Under each wing 104 is fastened at least one powerplant 151 comprising a nacelle 149 consisting of cowls 147 forming an aerodynamic outer surface.

Figure 2:
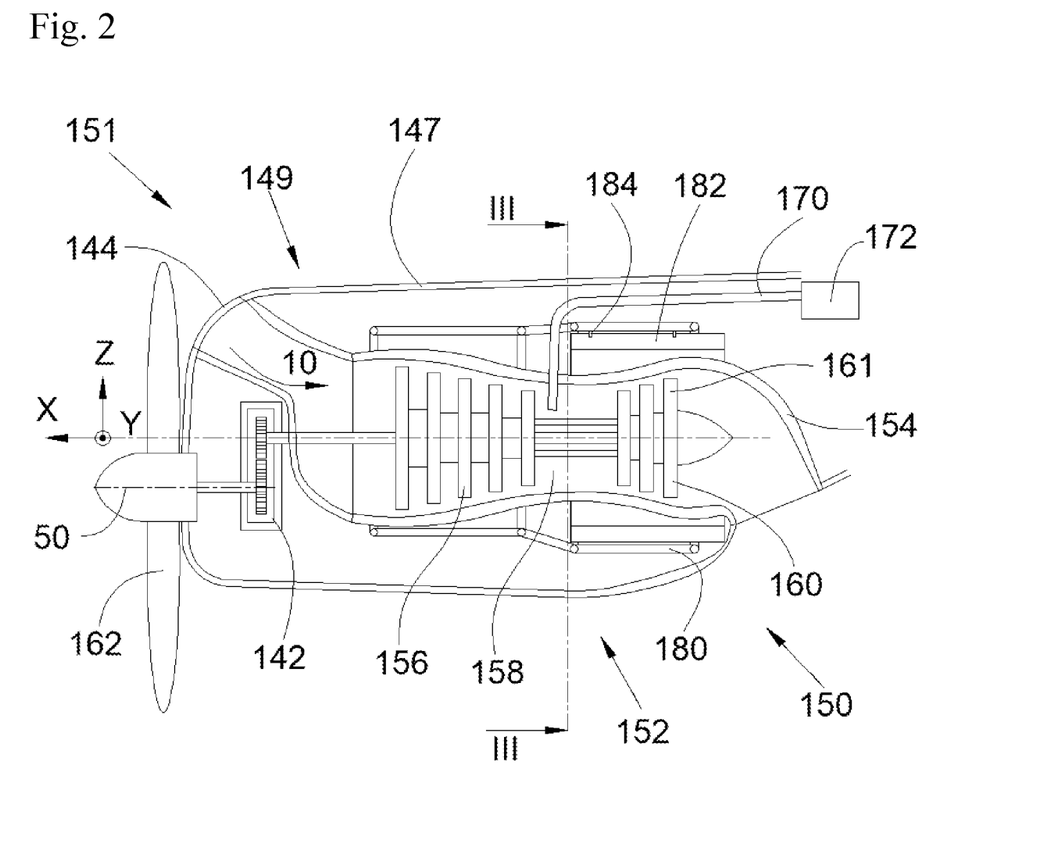
FIG. 2 is a schematic cross-sectional side view of a propulsion system of the powerplant according to the invention.

FIG. 2 shows the powerplant 151, which also comprises a propulsion system 150 that is shown schematically. The powerplant 151 comprises a frame 180 that fastens the powerplant 151 to a structure of the wing 104 and forms an attachment pylon. In the embodiment of the invention shown in FIG. 2, the frame 180 takes the form of a cage consisting, inter alia, of beams fastened to each other. The frame 180 is fastened to the structure of the wing by fastening means known to a person skilled in the art.

In the embodiment of the invention shown in FIG. 2, the propulsion system 150 is a turboprop engine that comprises a core 152 enclosed in a casing 154. In the embodiment of the invention shown in FIG. 2, the casing 154 is housed inside the frame 180 forming a cage and is fastened thereto by any appropriate means known to a person skilled in the art.

Outside air enters the nacelle 149 through an opening 144 provided in the cowls 147 at the front of the nacelle 149.

Inside the nacelle 149, the primary air flow 10 enters the core 152 to supply the combustion chamber 158 with dioxygen.

The casing 154 is thus open at the front to allow the introduction of the primary flow 10 into the core 152 and open at the rear to allow the gases produced by combustion to be exhausted through a nozzle. The core 152 comprises, from upstream to downstream, a compressor 156, a combustion chamber 158 and a turbine 160. The compressor 156 and the turbine 160 are provided with blades 161 rotating about the longitudinal axis X.

The primary flow 10 thus passes in succession through the compressor 156 where it is compressed before being injected into the combustion chamber 158 where it is mixed with the fuel. The gases produced by combustion then pass through the turbine 160 and rotate it. The turbine 160 in turn rotates the compressor 156 and the gases are then discharged at the rear.

In the case of a turboprop engine, the propulsion system 150 comprises a propeller 162 that is at the front and rotated by the turbine 160. In the embodiment of the invention disclosed here, the propulsion system 150 also comprises a gearbox 142 mounted between the turbine 160 and the propeller 162 that rotates about an axis of rotation 50 parallel to the longitudinal axis X and is offset here relative to the longitudinal axis X.

Generally, the object of the invention is applied to a propulsion system 150 with a primary flow 10 inside the core 152.

The powerplant 151 also comprises a supply pipe 170 that makes it possible to convey dihydrogen as a fuel to the combustion chamber 158, being fluidly connected to a dihydrogen tank 172 of the aircraft 100. The supply pipe 170 thus snakes from the rear of the nacelle 149 outside the housing 154, thus running along and outside of the turbine 160 before dropping down into the combustion chamber 158 through the casing 154.

In the event of an incident on the propulsion system 150, the blades 161 of the turbine 160 might become detached and pass through the casing 154. In order to protect the supply pipe 170, the powerplant 151 comprises a protective cylinder 182 that is fastened to the frame 180 by fastening means 184 and is positioned around the casing 154 and between the supply pipe 170 and the turbine 160. The axis of the protective cylinder 182 is generally coaxial with the longitudinal axis X.

According to another embodiment, the protective cylinder 182 is fastened to the casing 154 by fastening means.

The front end of the protective cylinder 182 is positioned, perpendicular to the longitudinal axis X, at least at the level of the foremost blades 161 of the turbine 160, and the rear end of the protective cylinder 182 is positioned, perpendicular to the longitudinal axis X, at least at the level of the rearmost blades 161 of the turbine 160.

If a blade 161 of the turbine 160 became detached, the blade 161 would thus collide with the protective cylinder 182 and its path would be interrupted before it reached the supply pipe 170.

In the event of detachment, a blade 161 of the turbine 160 can depart radially relative to the longitudinal axis X, but there can be a degree of scattering and it can depart forwards or backwards. It is thus preferable to extend the protective cylinder 182 beyond the blades 161 of the turbine 160 to take into account the risk of scattering. It is thus preferable that the protective cylinder 182 extends in front of the foremost blades 161 of the turbine 160 and behind the rearmost blades 161 of the turbine 160.

Due to the position of the supply pipe 170, which is at the rear relative to the combustion chamber 158, the supply pipe 170 never runs along the compressor 156 and it is not therefore necessary to put in place a protective plate. Of course, if in another configuration the supply pipe 170 runs along the compressor 156, a similar protective cylinder can be put in place.

Due to the footprint at the bottom of the frame 180 in which the casing 154 is housed, the supply pipe 170 preferably extends at the top of the frame 180 and therefore above the casing 154.

Putting a protective cylinder 182 in place around the casing 154 makes it possible, even if the fastening means fail, to hold the protective cylinder 182 around the casing 154 so that it still protects the supply pipe 170.

The protective cylinder 182 is, for example, made from a titanium alloy with high specific strength such as the alloy known as Ti-6A1-4V and has, for example, a thickness of the order of 30 mm.

Figure 3:
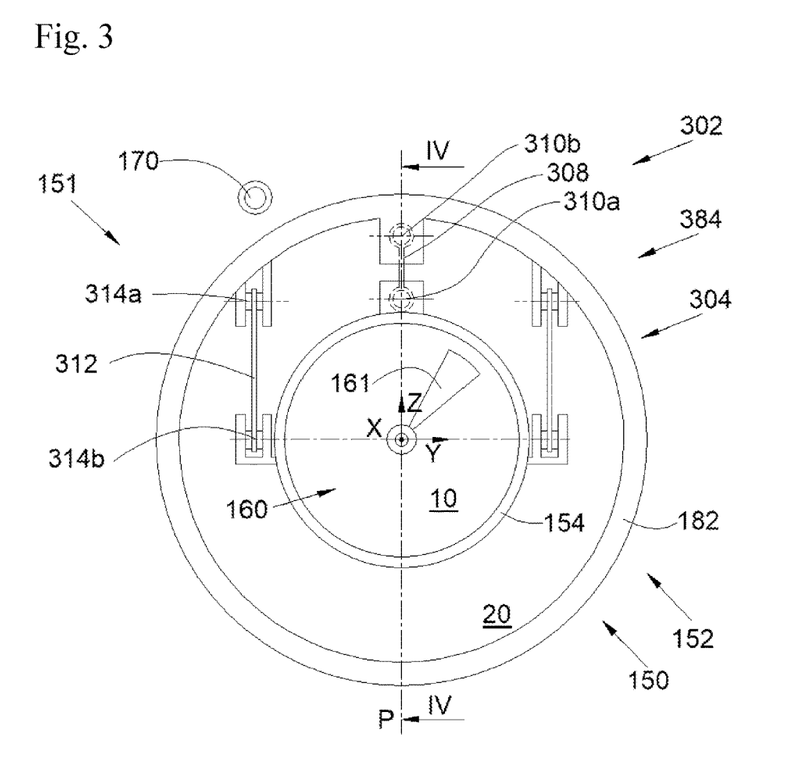
FIG. 3 is a schematic cross-sectional view along the line III-III of a powerplant according to a first variant embodiment of the invention.
Figure 4:
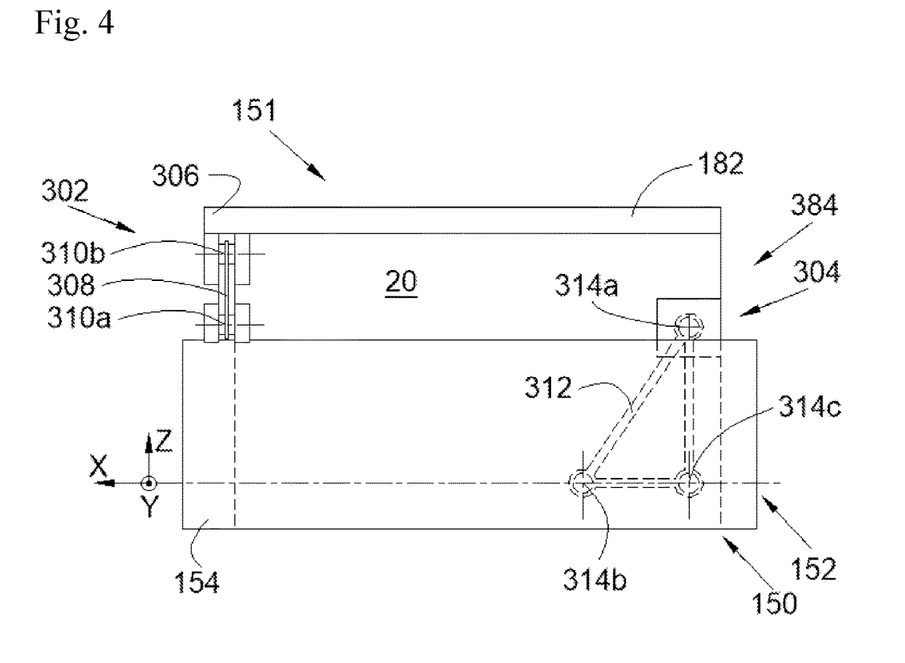
FIG. 4 is a cross-sectional view along the line IV-IV of the powerplant in FIG. 3.

FIG. 3 and FIG. 4 show a first variant of the invention in which the protective cylinder 182 is fastened to the casing 154 by fastening means 384.

The fastening means 384 comprise a front fastening system 302 and two lateral fastening systems 304. The front fastening system 302 is arranged at the level of a front part 306 of the protective cylinder 182 and the lateral fastening systems 304 are positioned on either side of the vertical mid-plane P (XZ) of the powerplant 151 and behind the front part 306.

The front fastening system 302 comprises a front rod 308 hingedly fastened by a first connection point 310*a* to the casing 154 at the level of the mid-plane P and by a second connection point 310*b* to the protective cylinder 182 at the level of the mid-plane P. The first connection point 310*a* is below the second connection point 310*b*.

The front rod 308 is contained in a plane perpendicular to the longitudinal axis X.

Each lateral fastening system 304 comprises a lateral rod 312 hingedly fastened by a first connection point 314*a* to the protective cylinder 182 and by two second connection points 314*b-c* to the casing 154, in which the three connection points 314*a-c* of each lateral fastening system 304 are positioned in a plane parallel to the mid-plane P. The first connection point 314*a* is above the second connection points 314*b-c*.

Figure 5:
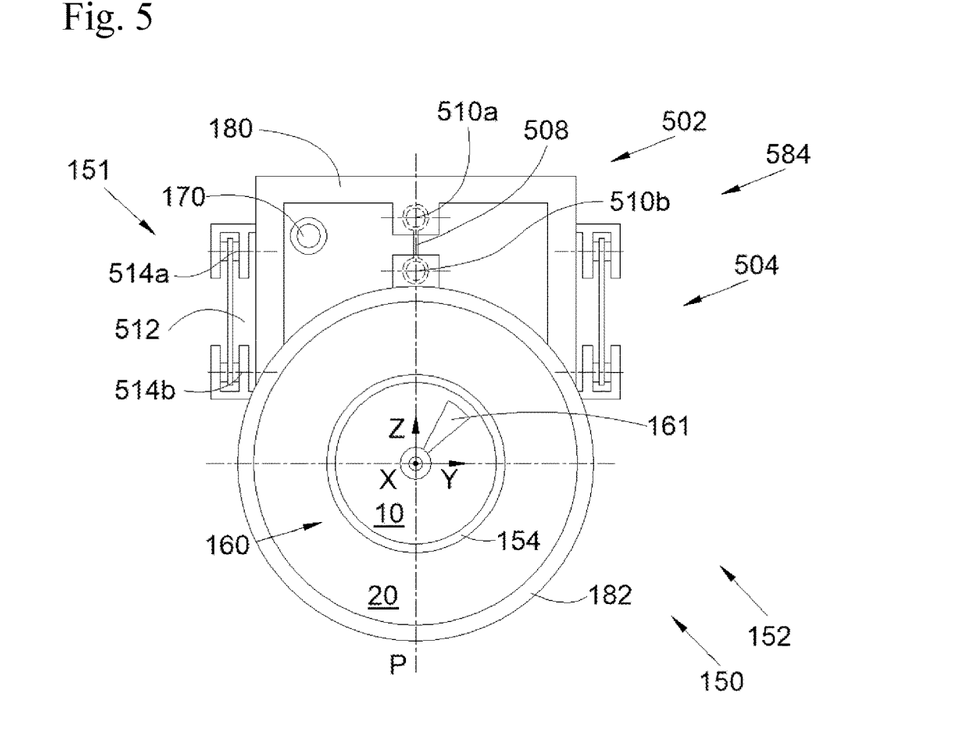
FIG. 5 is a similar view to FIG. 3, for a powerplant according to a second variant embodiment of the invention.
Figure 6:
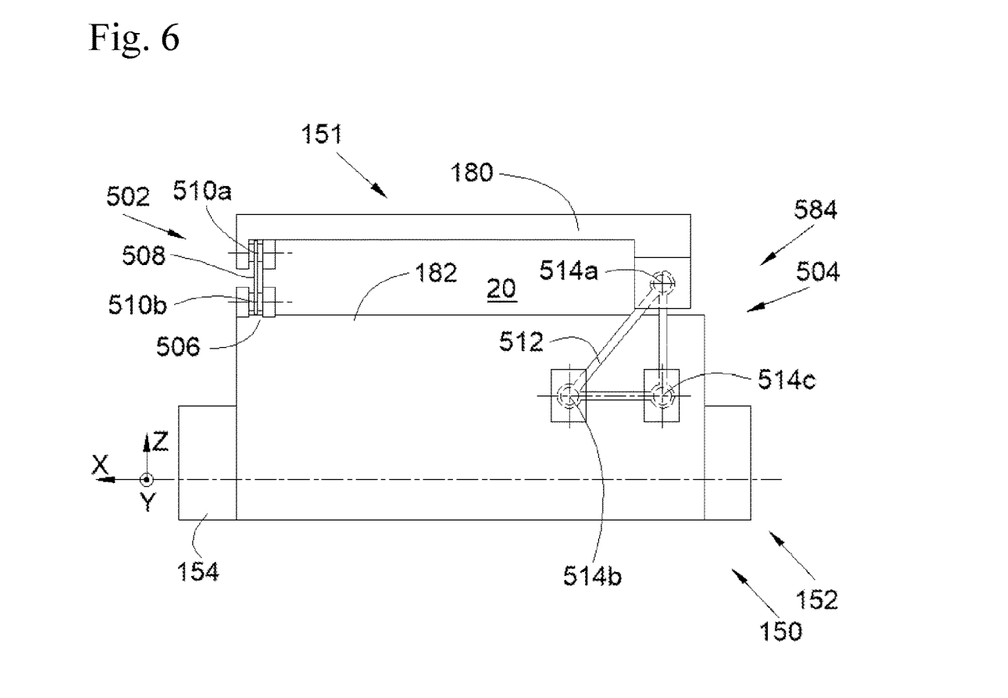
FIG. 6 is a side view of the powerplant in FIG. 5.

FIG. 5 and FIG. 6 show a second variant of the invention in which the protective cylinder 182 is fastened to the frame 180 by fastening means 584.

The fastening means 584 comprise a front fastening system 502 and two lateral fastening systems 504. The front fastening system 502 is arranged at the level of a front part 506 of the protective cylinder 182 and the lateral fastening systems 504 are positioned on either side of the vertical mid-plane P (XZ) of the powerplant 151 and behind the front part 506.

The front fastening system 502 comprises a front rod 508 hingedly fastened by a first connection point 510*a* to the frame 180 at the level of the mid-plane P and by a second connection point 510*b* to the protective cylinder 182 at the level of the mid-plane P. The first connection point 510*a* is above the second connection point 510*b*.

The front rod 508 is contained in a plane perpendicular to the longitudinal axis X.

Each lateral fastening system 504 comprises a lateral rod 512 hingedly fastened by a first connection point 514*a* to the frame 180 and by two second connection points 514*b-c* to the protective cylinder 182, in which the three connection points 514*a-c* of each lateral fastening system 504 are positioned in a plane parallel to the mid-plane P. The first connection point 514*a* is above the second connection points 514*b-c*.

Each connection point of the embodiments in FIGS. 3 to 6 produces at least one pivot connection, the axes of the connection points 310*a-b* and 510*a-b* of the front fastening systems 302 and 502 are parallel to the longitudinal axis X and the axes of the connection points 314*a-c* and 514*a-c* of the lateral fastening systems 304 and 504 are parallel to the transverse axis Y.

Figure 10:
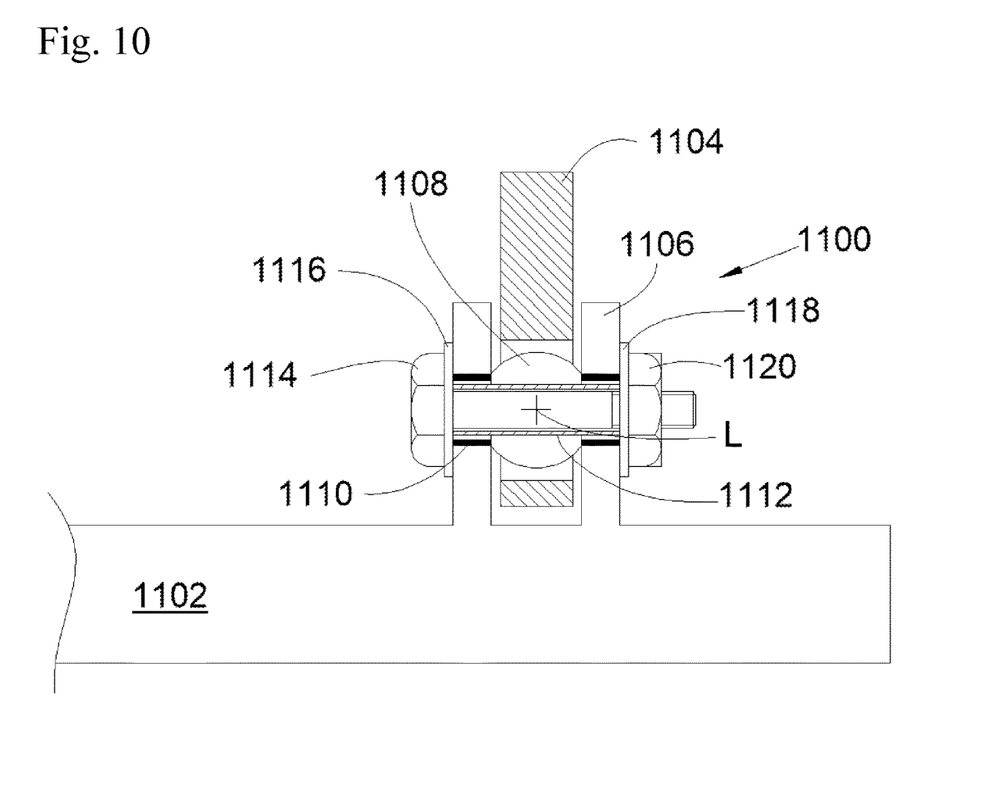
FIG. 10 is a view of a detail of fastening means.

Preferably however, each connection point produces a ball joint connection, an embodiment of which is shown in FIG. 10.

FIG. 10 shows a detail of each connection point 1100 between a first element 1102 and a second element 1104. The first element 1102 can be the frame 180, the casing 154 or the protective cylinder 182 and the second element 1104 is a rod.

The first element 1102 comprises a clevis with two arms 1106 between which is arranged a swivel bearing 1108 rigidly connected to the second element 1104. Each arm is pierced by a bore in which is inserted an end sleeve 1110. A hinge pin 1112 that takes the form of a hollow cylindrical stem is slidably fitted into each of the end sleeves 1110 and force fitted into a bore made in the swivel bearing 1108 in order to make it possible for the swivel bearing 1108 to pivot relative to the clevis about a connection axis L.

On one side of the clevis, a screw 1114 is inserted into the hinge pin 1112 and a first flat lock washer 1116 is fitted onto the shank of the screw 1114 and interposed between the head of the screw 1114 and an end sleeve 1110, and on the other side of the clevis, a second flat lock washer 1118 is fitted onto the shank of the screw 1114 and interposed between the other end sleeve 1110 and a threaded end of the screw, where a clamp nut 1120 is tightened to the desired torque on the threaded end of the screw 1114 to come up against the second flat lock washer 1118 and hold the washers 1116 and 1118 pressed against the end sleeves 1110.

The assembly of the two elements together is finalized by the axial immobilization, along the connection axis L, of the end sleeves 1110 and the swivel bearing 1108. This immobilization is achieved due to the compaction between the clamp nut 1120 in contact with the second lock washer 1118 and the head of the screw 1114 in contact with the first lock washer 1116.

Figure 7:
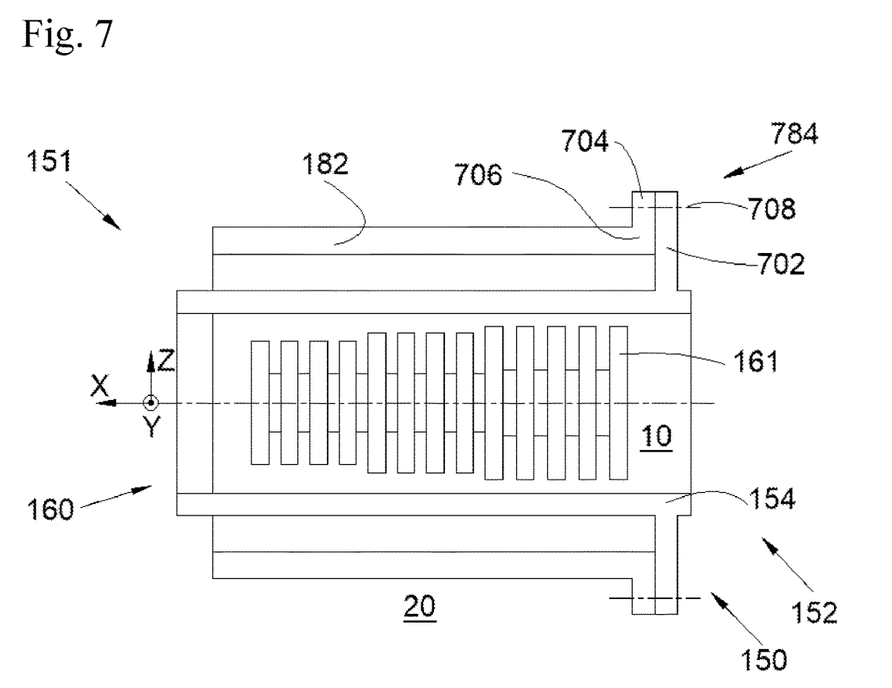
FIG. 7 is a schematic cross-sectional side view of a powerplant according to a third variant embodiment of the invention.

FIG. 7 shows a third variant of the invention in which the protective cylinder 182 is fastened to the frame 180 by fastening means 784.

The fastening means 784 comprise an outer flange 702 and an inner flange 704.

In the embodiment of the invention shown in FIG. 7, the flanges 702 and 704 are arranged at the level of a rear part 706 of the protective cylinder 182. However, according to another embodiment of the invention, not shown, they are positioned at the level of a front part of the protective cylinder 182. In another embodiment, not shown, one flange pair 702, 704 is arranged at the level of a rear part 706 of the protective cylinder, and another flange pair 702, 704 is arranged at the level of a front part of the protective cylinder 182.

The outer flange 702 is rigidly connected to the casing 154 and the inner flange 704 is rigidly connected to the protective cylinder 182.

The protective cylinder 182 is around the casing 154 and the inner flange 704 bears on a front face of the outer flange 702. The fastening means 784 comprise fastening elements 708 that fasten the two flanges 702 and 704 against each other. The fastening elements 708 are, for example, bolts.

In the variants disclosed below, the protective cylinder 182 consists of a single element but it can comprise a plurality of elements fastened to each other.

Figure 8:
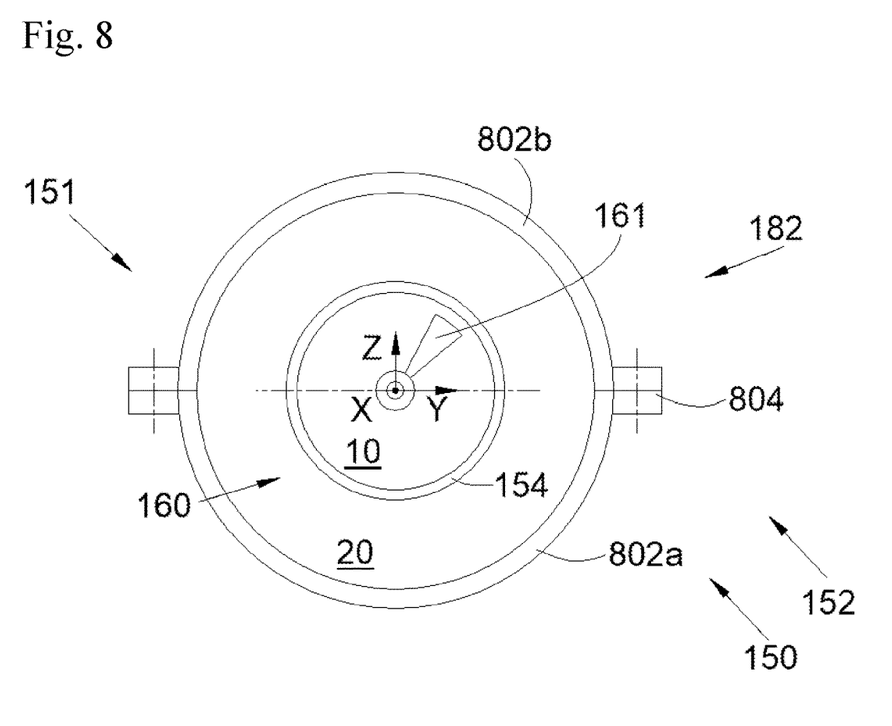
FIG. 8 is a similar view to FIG. 3, for a powerplant according to the invention with a particular protective cylinder.

In the embodiment of the invention shown in FIG. 8, the protective cylinder 182 thus comprises at least two hollow cylinder portions 802a-b fastened to each other by rigid connection systems 804.

In the embodiment of the invention shown in FIG. 8, there are two semi-cylinders 802a-b and here the rigid connection systems 804 are longitudinal ribs fastened by bolts. This embodiment can apply to all of the variants described above. In FIG. 8, the fastening means 184 are not shown, but they can take the form of those described above.

Figure 9:
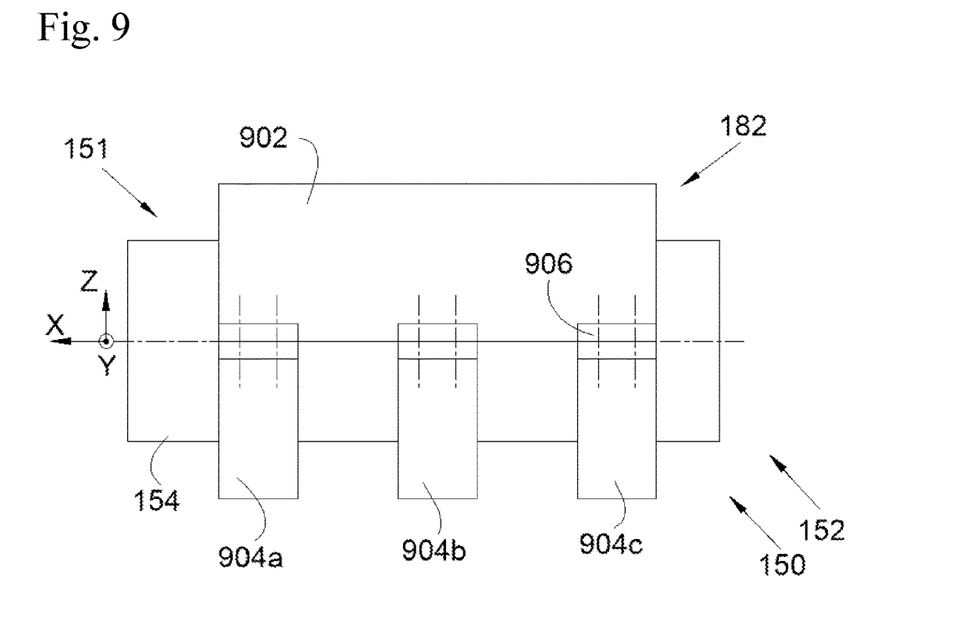
FIG. 9 is a side view of a powerplant according to the invention with a particular protective cylinder.

As shown in FIG. 9, in order to make the protective cylinder 182 lighter, it comprises an upper semi-cylinder 902 and a plurality of lower semi-cylinders 904a-c, here three in number, which are all coaxial. The upper semi-cylinder 902 is solid and whole along its entire length so that it protects the supply pipe 170, which is above. The lower semi-cylinders 904a-c extend parallel to the longitudinal direction X over reduced lengths and each lower semi-cylinder 904a-c is fastened to the upper semi-cylinder 902 by rigid connection systems 906, such as for example here longitudinal ribs fastened by bolts, and there are gaps between two consecutive lower semi-cylinders 904a-c. Two adjacent lower semi-cylinders 904a-c are separated from each other parallel to the longitudinal axis X.

This embodiment can apply to all of the variants described above. In FIG. 9, the fastening means 184 are not shown, but they can take the form of those described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A powerplant for an aircraft comprising:
a frame,
a propulsion system fastened to the frame and comprising a core enclosed in a casing and comprising a combustion chamber and a turbine provided with blades rotating about a longitudinal axis,
a supply pipe for conveying dihydrogen to the combustion chamber, in which the supply pipe snakes outside the casing running along the turbine before dropping down into the combustion chamber through the casing, and
a protective cylinder fastened to the frame or to the casing by fastening means and positioned around the casing and between the supply pipe and the turbine,
wherein the fastening means comprise a front fastening system arranged at a level of a front part of the protective cylinder and two lateral fastening systems positioned on either side of a vertical mid-plane of the powerplant,
wherein the front fastening system comprises a front rod hingedly fastened by a first connection point to the casing at a level of the mid-plane and by a second connection point to the protective cylinder at the level of the mid-plane, and
wherein each lateral fastening system comprises a lateral rod hingedly fastened by a first connection point to the protective cylinder and by two second connection points to the casing.

2. The powerplant according to claim 1, wherein a front end of the protective cylinder is positioned, perpendicular to the longitudinal axis, at least at foremost blades of the turbine, and a rear end of the protective cylinder is positioned, perpendicular to the longitudinal axis, at least at rearmost blades of the turbine.

3. The powerplant according to claim 2, wherein the protective cylinder extends in front of the foremost blades of the turbine and behind the rearmost blades of the turbine.

4. The powerplant according to claim 1, wherein the protective cylinder comprises at least two hollow cylinder portions fastened to each other by rigid connection systems.

5. The powerplant according to claim 4, wherein a first of the hollow cylinder portions comprises an upper semi-cylinder and a plurality of lower semi-cylinders each form an additional hollow cylinder portion of the hollow cylinder portions, wherein the lower semi-cylinders are fastened to the upper semi-cylinder by rigid connection systems, and wherein two adjacent lower semi-cylinders are separated from each other parallel to the longitudinal axis.

6. An aircraft comprising a wing, a dihydrogen tank and at least one powerplant, the at least one powerplant comprising:
a frame,
a propulsion system fastened to the frame and comprising a core enclosed in a casing and comprising a combustion chamber and a turbine provided with blades rotating about a longitudinal axis,
a supply pipe for conveying dihydrogen to the combustion chamber, in which the supply pipe snakes outside the casing running along the turbine before dropping down into the combustion chamber through the casing, and
a protective cylinder fastened to the frame or to the casing by fastening means and positioned around the casing and between the supply pipe and the turbine;
wherein the fastening means comprise an outer flange rigidly connected to the casing and an inner flange rigidly connected to the protective cylinder and arranged at a rear part of the protective cylinder,
wherein the inner flange bears on a front face of the outer flange, and
wherein the fastening means comprise fastening elements that fasten the outer flange and the inner flange against each other.

7. A powerplant for an aircraft comprising:
a frame,
a propulsion system fastened to the frame and comprising a core enclosed in a casing and comprising a combustion chamber and a turbine provided with blades rotating about a longitudinal axis,
a supply pipe for conveying dihydrogen to the combustion chamber, in which the supply pipe snakes outside the casing running along the turbine before dropping down into the combustion chamber through the casing, and
a protective cylinder fastened to the frame or to the casing by fastening means and positioned around the casing and between the supply pipe and the turbine;

wherein the fastening means comprise a front fastening system arranged at a level of a front part of the protective cylinder and two lateral fastening systems positioned on either side of a vertical mid-plane of the powerplant, wherein front fastening system comprises a front rod hingedly fastened by a first connection point to the frame at a level of the mid-plane and by a second connection point to the protective cylinder at the level of the mid-plane, and wherein each lateral fastening system comprises a lateral rod hingedly fastened by a first connection point to the frame and by two second connection points to the protective cylinder.

* * * * *